United States Patent [19]
Wheeler, Jr.

[11] 4,066,883
[45] Jan. 3, 1978

[54] TEST VEHICLE FOR SELECTIVELY INSERTING DIAGNOSTIC SIGNALS INTO A BUS-CONNECTED DATA-PROCESSING SYSTEM

[75] Inventor: Delwyn Roche Wheeler, Jr., Longmont, Colo.

[73] Assignee: International Business Machines Corporation, Armonk, N.Y.

[21] Appl. No.: 744,847

[22] Filed: Nov. 24, 1976

[51] Int. Cl.² .......................................... G06F 11/00
[52] U.S. Cl. .................................. 235/304; 235/302; 364/900
[58] Field of Search ................ 235/153 AK, 153 AC, 235/153 R, 302, 304; 364/200, 900

[56] References Cited
U.S. PATENT DOCUMENTS

| | | | |
|---|---|---|---|
| 3,553,654 | 1/1971 | Crane | 364/900 |
| 3,603,936 | 9/1971 | Attwood et al. | 235/153 AK |
| 3,771,131 | 11/1973 | Ling | 364/900 |
| 3,810,120 | 5/1974 | Huettner et al. | 364/900 |
| 3,825,901 | 7/1974 | Golnek, Sr. et al. | 364/900 |
| 3,876,987 | 4/1975 | Dalton et al. | 364/900 |

OTHER PUBLICATIONS

Kulka et al., Diagnostic Procedures, IBM Technical Disclosure Bulletin, vol. 14, No. 9, Feb. 1972, pp. 2749–2750.
Keefeler, Diagnosing Multiple Path Data Processing Systems, IBM Technical Disclosure Bulletin, vol. 16, No. 6, Nov. 1973, pp. 1903–1904.

*Primary Examiner*—Charles E. Atkinson
*Attorney, Agent, or Firm*—Herbert F. Somermeyer

[57] ABSTRACT

A test vehicle capable of being interleaved in a bus-connected data-processing system includes two unidirectional transmission units having outputs connected to opposite ones of bus connecting terminals and inputs connected to such terminals. A direction controller in the vehicle controls the transmission of signals through the unidirectional transmission units. Each of the transmission units has means for receiving diagnostic signals from an external source which also controls the directional controller which in turn controls the transmission units. The direction controller further receives signals from the transmission units for controlling transmission of signals therethrough.

11 Claims, 2 Drawing Figures

TEST VEHICLE FOR SELECTIVELY INSERTING DIAGNOSTIC SIGNALS INTO A BUS-CONNECTED DATA-PROCESSING SYSTEM

BACKGROUND OF THE INVENTION

The present invention relates to diagnostic units, particularly those diagnostic units having utility in testing bus-connected data-processing systems.

In the past few years data processing systems, particularly of the micro- and minicomputer type, have a plurality of either synchronous or asynchronously operating units which are all tied together via a multiconductor bus. When such units include programmable units having multiprogramming capabilities, diagonosis of error conditions within such a system becomes extremely complex. Such error conditions can result from software errors or microcode errors, as well as hardware errors. Accordingly, such diagnostic unit must be capable of being selectively inserted at one of any diverse locations in the bus for maximizing testing flexibility.

Some prior art testing techniques have included a separate diagnostic bus independent of the data transfer busses. Such diagnostic busses include addressing unit techniques for isolating a failing unit, whether it be caused by software or hardware. However, such units do not have the facility for testing the system of such interconnected units in a system sense, particularly for injection of anomalous signals for test purposes. Attwood et al. in U.S. Pat. No. 3,603,936 teach simulating conditions by injection of microcode within a control memory. While this sytem is highly advantageous for debugging microcode sequences, it is not particularly adaptable for testing multiunit systems of the bus connected type. As example of additional testing for diagnostic circuits incorporated with the data processing system is shown by Crane in U.S. Pat. No. 3,553,654. There a rack fault circuit is connected to a plurality of computing elements, however, not of the bus connected type. Additional examples of diagnostic connections are included in the IBM Technical Disclosure Bulletin in articles by W. A. Boothroyd and P. M. Chan, "Half Duplex Teleprocess Organization," May 1970, pages 2319–2320, as well as by R. W. Macak and J. R. Mathis in "Program Controlled Test of External Interface," March 1970, page 1614. The latter shows testing interfaces of cascade connected units using simulation hardware integral with the units connected to a computer or CPU.

It is desired that greater flexibility in testing of bus-connected data-processing units be available.

SUMMARY OF THE INVENTION

It is an object of the invention to provide an efficient diagnostic connection unit for interposition in a bus-connected data-processing system.

A test vehicle constructed in accordance with the present invention for selectively interjecting diagnostic signals on a bus includes a pair of terminals for connection to the bus, a pair of AND circuits respectively connected to the terminals for receiving data processing signals via the bus, a pair of combining circuits respectively connected to receive signals from the AND circuits and having an output connected to the termianls respectively not connected to said respective AND circuits, a pair of diagnostic input connections respectively connected to the combining circuits for injection of diagnostic signals, and a direction controller receiving signals from the AND circuits and having a diagnostic connection for receiving a control signal with electrical output control connections to said AND circuits for enabling one and only one of said AND circuits at a time, all in accordance with signals received by the direction controller. In a preferred form of the controller a pair of latches are respectively set to the active condition by outputs of the AND circuits for disabling one and only one of the AND circuits. The diagnostic unit has an input connection for resetting the latches for dynamic interleaving of signals.

The foregoing and other objects, features, and advantages of the invention will be apparent from the following more particular description of preferred embodiments of the invention, as illustrated in the accompanying drawings.

THE DRAWINGS

FIG. 1 is a block diagram of a bus-connected data-processing system having interleaved test vehicles for diagnostic purposes.

FIG. 2 includes a schematic diagram of a test vehicle constructed in accordance with the present invention.

DETAILED DESCRIPTION OF THE INVENTION

Figure 1:
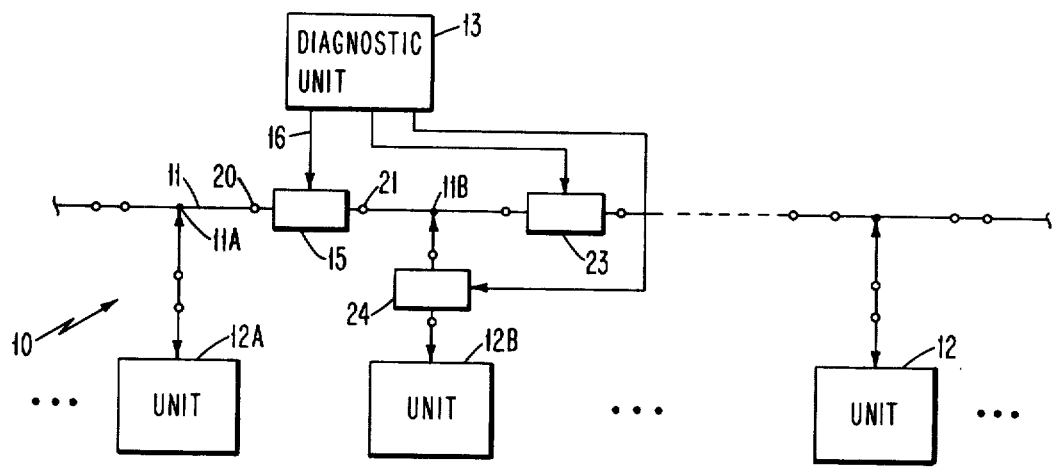

A bus-connected data-processing system 10 includes a bidirectional data bus 11 connected at various points to a plurality of data processing units collectively denoted by numeral 12. A diagnostic unit 13 such as a System 7 computer constructed by International Business Machines Corporation, Armonk, N.Y., contains programs (not shown) designed to exercise the data processing units 12 as they are connected via bus 11. One or more test vehicles are selectively interleaved in bus 11. For example, unit 15 is electrically interposed between bus connecting points 11A and 11B, respectively, between units 12A and 12B. A control connection 16 extends from diagnostic unit 16 to test vehicle 15. A pair of terminals 20 and 21 connect test vehicle 15 to bus 11 and interrupts the bus connections between points 11A and 11B.

While a single test vehicle 15 may be used in diagnosing bus-connected data-processing system 10, a plurality of such units may be simultaneously used as well as being individually placed in diverse locations of the bus. For example, test vehicle 23 is located to the right of bus point 11B, while test vehicle 24 is interconnected between bus point 11B and data processing unit 12B. The other test vehicles 23, 24 are respectively connected to diagnostic unit 13 as shown for receiving control signals in the same manner that test vehicle 15 receives control signals. In this regard it should be noted that when bus 11 has a plurality of conductors, test vehicles 15, 23, 24 include a like plurality of the later described transmission units, one for each conductor in each direction of transmission with a single controller for controlling the entire test vehicle.

Figure 2:
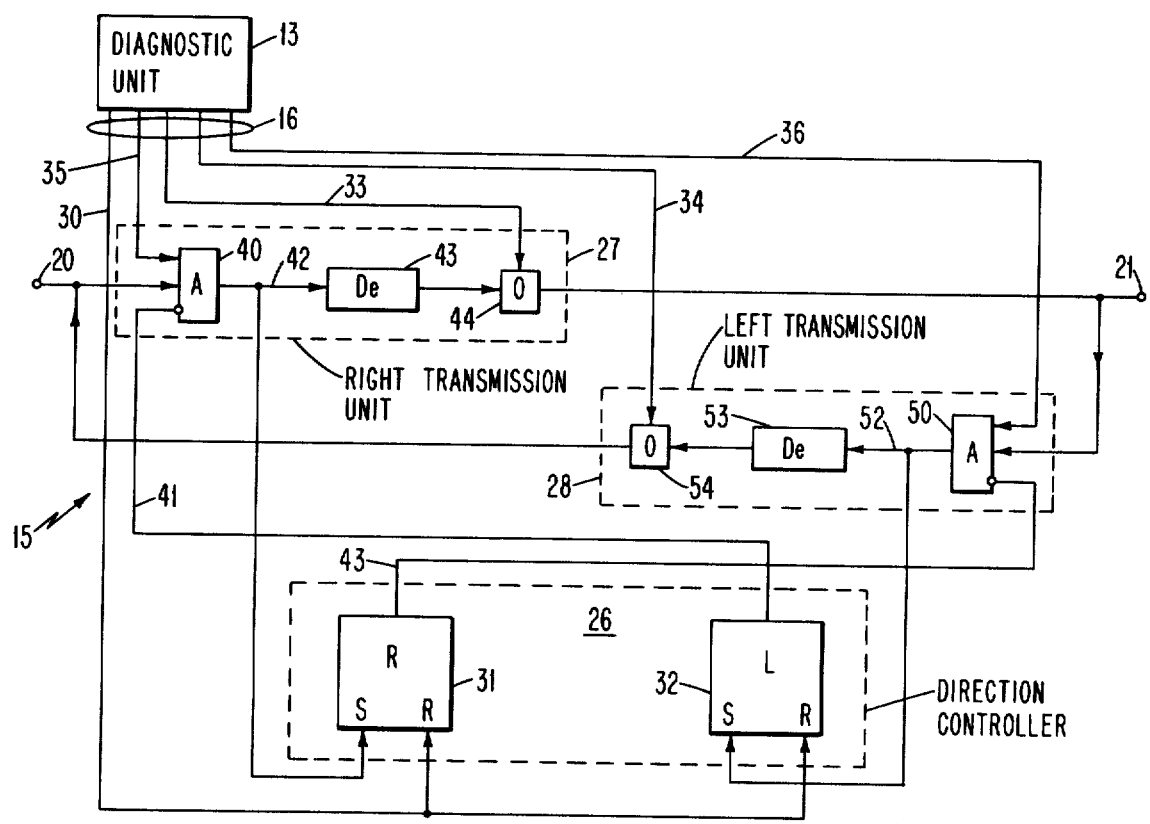

FIG. 2 is a detailed showing of a single conductor connection for test vehicle 15 together with a preferred form of a direction controller 26. Right transmission unit 27 and a left transmission unit 28 are actuated by controller 26 under direction of diagnostic unit 13 as well as by the operation of the data processing system 10.

Diagnostic unit 13 has output cable 16 for controlling test vehicle 15 in one of a plurality of modes. Assuming that no transmissions have occurred on bus 11 and that diagnostic unit 13 has supplied a test vehicle reset signal over line 30, resetting direction controller 26 to a reset state by resetting the right latch 31 and left latch 32. Right latch 31 disables the left transmission unit while permitting signal transmissions from terminal 20 to terminal 21. Simularly, left latch 31 disables right transmission unit 27 while permitting transmission of signals from terminal 21 to terminal 20. Signal transmissions may include interjected diagnostic signals from unit 13 via line 33 for the right transmission unit 27 and over line 24 for the left transmission unit 28. Additionally, diagnostic unit 16 supplies transmission controlling signals respectively over lines 35 and 36 to transmission units 27, 28.

Assume that unit 12A transmits signals to unit 12B. Such data processing signals are received by test vehicle 15 at terminal 20 and supplied to AND circuit 40 within transmission unit 27. Direction controller 26 being reset provides a gate enabling signal over line 41. The line 41 signal together with the diagnostic unit 13 supplied signal over line 35 enables AND circuit 40 to pass the terminal 20 received signals to line 42. A signal on line 42 travels to direction controller 26 setting right latch 31 to the active state. This action causes latch 31 to supply a transmission unit disabling signal over line 43 to left transmission unit 48. The line 42 signal also travels through delay circuit 43, thence through OR or combining circuit 44 for retransmission to bus 11 via terminal 21. In the event the diagnostic unit 13 desires to supply interjected signals, the diagnostic signals to be interjected are supplied over line 33 to combining circuit 44.

In a first mode, AND circuit 40 is disabled by the signal on line 35 preventing the passage of signals from terminal 20 to line 42. As a result, terminal 21 only passes signals from line 33. On the other hand, AND circuit 40 may be enabled by the line 35 signal for passing the data processing signals from unit 12A while diagnostic unit 13 interleaves further diagnostic signals from line 33 with the data processing signals over terminal 21. It should be noted that if unit 12A does not supply signals through AND circuit 40, direction controller 26 operation is not affected by the injection of signals from diagnostic unit 13 via combiner circuit 44. Additionally, the diagnostic signals on line 33 can travel not only through terminal 21, but also through left transmission unit 28 then over terminal 20 to unit 12A.

The left transmission unit 28 is constructed identically with unit 27. That is, AND circuit 50 receives control signals via lines 36 from diagnostic unit 13 and via line 43 from direction controller 26. Data signals from terminal 21 or from combiner circuit 44 are selectively passed through AND circuit 50 in accordance with the above-described control signals. A signal on line 52 sets latch 32 for supplying it disabling signal over line 41 to AND circuit 40 of transmission unit 27. The AND circuit 50 signal also travels through delay circuit 53, then through OR or combiner circuit 54 to terminal 20. Similarly, combiner circuit 54 can receive diagnostic injection signals over line 34 for transmission to terminal 20 in the same manner that combiner circuit 44 received signals over line 33.

In accordance with all of the above, it is seen that diagnostic unit 13 has complete control over the bus connected data processing system 10 for injecting signals either in one direction on bus 11, in both directions to or from any of the units in the data processing system, as well as interleaving data processing and diagnostic signals on the bus. It is to be understood that with regard to FIG. 2 that there is one transmission unit 27, 28 for each of the conductors in the bus.

While the invention has been particularly shown and described with reference to preferred embodiments thereof, it will be understood by those skilled in the art that various changes in form and details may be made therein without departing from the spirit and scope of the invention.

What is claimed is:

1. A test vehicle for a bus-connected data-processing system for selectively interjecting diagnostic signals on the bus via a pair of terminals adapted to be attached to a bus such that bus signals flow through the test vehicle via said terminals and to the exclusion of data processing signals normally on said bus characterized in that a pair of AND circuits are connected respectively to said terminals for receiving data processing signals therefrom, a pair of combining circuits respectively connected to receive signals from said AND circuits and having outputs connected to said terminals respectively not connected to said respective AND circuits, a pair of diagnostic input connections for receiving diagnostic input signals respectively connected to said combining circuits, and a direction controller receiving signals from said AND circuits and having a diagnostic control connection for receiving control signals and having electrical connections to said AND circuits for enabling one and only one of said AND circuits in accordance with signals received by said direction controller.

2. The test vehicle set forth in claim 1 further including delay circuit means electrically interposed respectively between said AND circuits and said combining circuits whereby signal outputs of said combining circuits are delayed with respect to the outputs of said AND circuit such that said direction controller can respond to said AND circuit signal prior to either of said combiner circuits supplying an output signal.

3. The test vehicle set forth in claim 1 wherein said direction controller includes an L latch and an R latch, said R latch being responsive to a signal from a first of said AND circuits to assume an active condition for inhibiting second of said AND circuits,
said L latch being responsive to said second AND circuit to assume a set state for inhibiting operation of said first AND circuit, and
electrical control connection means for receiving diagnostic signals for resetting both of said latches.

4. The test vehicle set forth in claim 1 further including a first diagnostic connection for receiving and AND-circuit-enabling signal and supplying same to a first of said AND circuits, and
a second diagnostic enabling connection for receiving a second AND-circuit-enabling signal and being connected to a second one of said AND circuits whereby direction of signal transfer through said vehicle is controllable by signals received over said diagnostic enabling connections.

5. The test vehicle set forth in claim 1 wherein said direction controller includes memory means responsive to signals from said AND circuits and said memory means including control signal output means for selectively inhibiting operation of one of said AND circuits in response to a signal from another one of said AND circuits whereby signal transmissions through said test vehicle occur only in a single direction, and means for resetting said direction controller for enabling a selection of said single direction.

6. A test vehicle for a bus-connected data-processing system for selectively interjecting diagnostic signals on a bus via a pair of terminals to the exclusion of data processing signals characterized in that said test vehicle has a right transmission unit and a left transmission unit respectively interconnecting said terminals for transmission of signals in mutually exclusive opposite directions, and
- a direction controller connected to said transmission units for actuating and deactuating same and responsive to signals received from said transmission units for actuating and deactuating said transmission units for limiting signal transmission on said bus to one of said opposite directions.

7. The test vehicle set forth in claim 6 further including combining circuit means in each set of transmission units and having a diagnostic input connection whereby diagnostic signals can be mixed with signals received from said terminals for mutually exclusive opposite directions of signal transfer.

8. A data processing test system including a bus-connected data-processing system, said bus having interjecting points located between two physically adjacent electrically connected units, said electrical connection being via said bus,
- a diagnostic unit for supplying control signals and diagnostic signals,
- a test vehicle interjection unit electrically interposed between said interjecting points on said bus and connected to said diagnostic unit for receiving said control signals and said diagnostic signals for selectively transferring said diagnostic signals to said bus, and
- transmission limiting means in said test vehicle for limiting transmissions in one of two directions on said bus whereby signals including said diagnostic signals are limited on the bus for facilitating analysis.

9. The test system set forth in claim 8 wherein said test vehicle includes a direction controller having memory means memorizing a first received signal from either one of said terminals and having control means inhibiting transmissions in the direction opposite to said first received signal.

10. The test system set forth in claim 9 further including diagnostic signal mixing means in said test vehicle and being connected to said diagnostic unit for receiving diagnostic signals therefrom.

11. The test system set forth in claim 9 wherein said test vehicle has a right transmission unit and a left transmission unit coupled between said terminals respectively for transmitting signals in opposing directions, each said transmission unit being connected to said direction controller for supplying signals thereto for limiting transmissions in one of said opposing directions, and
- each of said transmission units including a signal combiner circuit for receiving diagnostic signals and combining same for signals received from said terminals respectively and for supplying signals to opposite ones of said terminals respectively and including connections to said direction controller for inhibiting transmission of signals in one of said two directions.

* * * * *